United States Patent [19]

Lipowski

[11] Patent Number: 4,471,087

[45] Date of Patent: Sep. 11, 1984

[54] FORMALDEHYDE-FREE INSOLUBILIZERS FOR BINDERS FOR PAPER COATING COMPOSITIONS

[75] Inventor: Stanley A. Lipowski, Livingston, N.J.

[73] Assignee: Diamond Shamrock Chemicals Company, Dallas, Tex.

[21] Appl. No.: 470,393

[22] Filed: Feb. 28, 1983

[51] Int. Cl.$^3$ .................... C08L 61/24; C08G 12/36
[52] U.S. Cl. .................................. 524/512; 106/146; 106/148; 106/213; 106/214; 428/505; 428/513; 428/530; 524/597; 525/164; 525/509; 528/245; 564/60
[58] Field of Search ................ 528/245; 564/60; 524/843, 512, , 597; 525/164, 509; 106/213, 214; 428/505, 513, 530

[56] References Cited

U.S. PATENT DOCUMENTS

| | | | |
|---|---|---|---|
| 3,869,296 | 3/1975 | Kelly, Jr. et al. | 106/214 |
| 3,917,659 | 11/1975 | Glancy et al. | 260/555 R |
| 4,284,758 | 8/1981 | North | 528/245 |
| 4,343,655 | 8/1982 | Dodd et al. | 106/214 |

Primary Examiner—Theodore E. Pertilla
Attorney, Agent, or Firm—Lelie G. Nunn, Jr.

[57] ABSTRACT

A highly efficient formaldehyde-free coating composition insolubilizer is prepared by reacting about 3 moles of glyoxal with 1 mole of urea resulting in a formation of a low molecular weight oligomer in a yield of 95–96%. The molar ratio of glyoxal to urea is very critical in obtaining the highest efficiency and is kept within narrow limits. The coating compositions of the present invention possess 2 till 4 times higher wet-rub resistance than the prior art compositions.

5 Claims, No Drawings

FORMALDEHYDE-FREE INSOLUBILIZERS FOR BINDERS FOR PAPER COATING COMPOSITIONS

BACKGROUND OF THE INVENTION

1. Field of the Invention

This invention relates to use of low molecular weight polymers (oligomers) as insolubilizers for binders in paper coating compositions.

2. Description of the Prior Art

Polymers have been used as insolubilizers for binders in paper coating compositions.

U.S. Pat. No. 3,869,296—Kelly, Jr. et al., issued Mar. 4, 1975, describes paper coating compositions containing a pigment, starch as binder for the pigment and a insolubilizing agent for the binder, being the reaction product of glyoxal and urea at a mole ratio of 1.0 mole glyoxal to from about 0.5 mole to about 0.75 mole of urea. These compositions cure at low temperatures, are stable and provide coatings which possess high wet-rub resistance.

U.S. Pat. No. 3,917,659—Glancy et al., issued Nov. 4, 1975, describes dry, solid glyoxal-urea products obtained by drying the reaction product of 1.0 mole glyoxal to from 0.25 mole to 0.9 mole of urea. These products are useful in paper coating compositions.

U.S. Pat. No. 4,343,655—Dodd et al., issued Aug. 10, 1982, describes paper coating compositions containing at least one pigment, at least one binder and as an insolubilizer for the binder an alkylated product of the reaction of glyoxal and a cyclic urea at a mole ratio of about 0.5 to about 2.0 mole glyoxal to 1.0 mole of cyclic urea.

SUMMARY OF THE INVENTION

It has been found unexpectedly that when glyoxal and urea are reacted at temperatures between about 40 and about 50° C. for several hours using a very narrow molar ratio of glyoxal to urea, with the preferred ratio being about 3 moles of glyoxal to about 1 mole of urea, the resulting product contains 95-96% of a polymeric material having a low molecular weight, a water soluble oligomer which is a highly efficient formaldehyde-free paper coating composition insolubilizer. Any substantial deviation from the 3:1 ratio results in a highly decreased performance when used as a paper coating insolubilizer.

DETAILED DESCRIPTION

Polymers produced by the prior art could not successfully compete with melamine-formaldehyde resins due to their higher cost and poor performances when compared on a cost basis. The polymers produced by the present invention have numerous advantages over prior art polymers even when used in a fraction of the amount required for the melamine-formaldehyde resins to produce high wet-rub resistance deemed to be satisfactory in paper coating applications.

The present invention relates to production of an oligomer of glyoxal and urea. This oligomer is obtained by condensation of an aqueous solution containing about 3 moles of glyoxal and about 1 mole of urea at about 40 to about 50° C. for several hours.

The water soluble oligomer may be added in the form of an aqueous solution to paper coating compositions containing binders, pigments, preservatives, lubricants, defoamers and other additives. Coating compositions may contain starches such as natural starches, oxidized starches or enzyme converted starches having functional groups such as hydroxyl, carbonyl, amido or amino groups, proteins such as casein, latices such as styrene-butadiene resins or the like. Pigments, which may be present in coating compositions, include clays, titanium dioxide, calcium carbonate, carbon blacks, ultramarine blue or the like. Preservatives such as bactericides, fungicides, silimicides or the like may also be present in coating compositions.

Total solids content of the coating compositions may be within the range of about 40 to about 70% depending on the method of application and product requirements. In these coating compositions, the amount of binder is based upon the amount of pigment; the ratio varies with the amount of bonding desired and with the adhesive characteristics of the particular binder employed. The amount of binder may be from about 10 to about 25%, and preferably from about 12 to about 18% based on weight of the pigment. Amount of insolubilizer varies with the amount and properties of the binder and the amount of insolubilization desired; in general it is about 2% to about 15% by weight and preferably from about 5 to about 10% based on the weight of the binder. These coating compositions may be applied to paper or paper-like substrates by any known and convenient means.

For a fuller understanding of the nature and advantages of this invention, reference may be made to the following examples. These examples are given merely to illustrate the invention are not to be construed in a limiting sense. All quantities, proportions and percentages are by weight and all references to temperature are °C.

EXAMPLE I 435.0 parts by weight of a 40% by weight aqueous glyoxal solution containing 3.0 moles of glyoxal were charged into a glass lined reactor. Temperature of the charge was 23° C. and the pH 2.16. 60.0 parts by weight of urea containing 1.0 mole of urea were added to the agitated glyoxal solution. After 15 minutes, a uniform solution was obtained, the condensation temperature fell to 16° C. and the pH rose to 2.89. Low heat was applied and the temperature gradually increased over one hour's time to 45° C. The pH of the condensation solution dropped to 2.33. The condensation mixture was held at a constant temperature of 45° C. for the next 2.5 hours. At the end of this period, the pH of the condensation solution fell to 2.17. After 2 more hours at 45° C., no further change in pH was noted and the condensation mixture was cooled to 20° C. A mixture of 0.85 parts by weight sodium hydroxide 50% and 3.5 parts by weight water was prepared and added slowly under agitation. The resulting product, a pale-yellow, clear liquid having 46.9% by weight solids, a pH as is of 6.9 and a freezing point of −7° C., contained an oligomer. The molar ratio of glyoxal to urea in the oligomer was 3 moles of glyoxal to 1 mole of urea. The oligomer was analyzed by the following methods:

A total of 30.0 grams of the product was added to 600 grams of acetone, stirred with a glass rod for 10 minutes to obtain a white precipitate. The white precipitate, the oligomer, was transferred quantitatively to a weighed filter paper, washed 2 times with 200 grams acetone, dried in a vacuum dessicator and then overnight in an oven at 90°–100° C. The weight of the recovered oligomer was 13.44 grams.

30.0 grams at 46.9% solids = 14.07 grams
Recovered oligomer = 13.44 grams
oligomer yield = 95.5%

A 40% water solution of the recovered oligomer had a reduced viscosity at 30° C. ηsp/c = 0.089 as measured by the Cannon-Fenske instrument.

Structure of the oligomer was unknown but it is assumed to be:

6 moles of glyoxal + 2 moles of urea

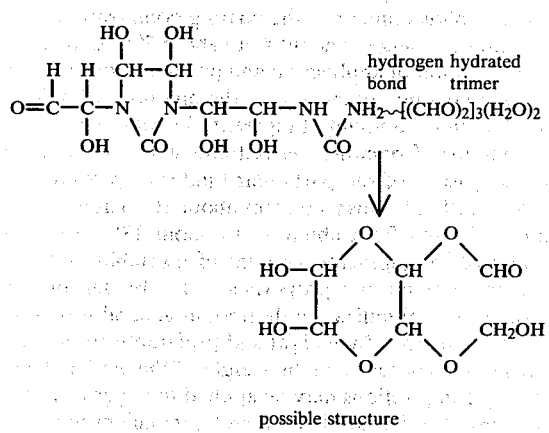

possible structure

Attempts to determine residual glyoxal remaining in the oligomer or the terminal CHO groups by simple alkalimetric method where excess of alkali is used to convert the glyoxal to glycolic acid by the Cannizzaro reaction were fruitless because under strong alkali conditions the oligomer was split resulting in formation of excess of glycolic acid groups and giving completely erroneous results.

The preferred method for determination of free glyoxal and terminal CHO groups, a method based on a kinetic study by the Department of Chemistry, University of Turku, Finland, was used. This method is based on addition of excess sodium bisulfite to glyoxal in a phosphate buffer system in order to effect a rapid addition reaction, after which the excess bisulfite is titrated with standard iodine solution under acid conditions in order to prevent the decomposition of the glyoxal-bisulfite adduct during the titration.

Following are the details of the method:

Apparatus

Erlenmeyer flasks, 250 ml; burette 25 ml;
Volumetric flasks, 1000 ml; 200 ml;
Automatic pipettes, 20 ml; 10 ml; 5 ml.

Reagents 0.05 Molar glyoxal solution = 7.25 grams glyoxal 40%/liter
0.01 Normal sodium bisulfite solution = 10.4 grams/liter (freshly prepared)
0.01 Normal iodine solution
Buffer solution, 71 grams $Na_2HPO_4$ + 17 grams $KHPO_4$/liter
1 Normal HCl solution
Starch indicator solution

Procedure

1. Add to a 250 ml Erlenmeyer flask exactly 20 ml 0.1 Normal sodium bisulfite solution. 10 ml buffer solution, 5 ml 1 Normal HCl solution. Titrate with 0.1 Normal iodine solution. Record the number of ml required = X.

2. Add to a 250 ml Erlenmeyer flask exactly 5 ml 0.05 molar glyoxal solution, 20 ml 0.1 Normal sodium bisulfite solution. Leave standing for 3 minutes time. Add 5 ml 1 Normal HCl solution. Titrate with 0.1 Normal iodine solution. Record the number of ml required = Y.

3. Dissolve exactly 5.8 grams of the tested liquid sample or 2.0 grams of the solid sample in a 200 ml volumetric flask with distilled water. Fill to the mark and shake well to get a uniform solution. Add 5 ml of the solution to a 250 ml Erlenmeyer flask followed by 10 ml buffer solution and 20 ml of 0.1 Normal sodium bisulfite solution. Leave standing for a 3 minute period. Add 5 ml 1 Normal HCl solution. Titrate with 0.1 Normal iodine solution. Record the number of ml required = Z.

Calculation

% free glyoxal + CHO terminal groups
5.8 grams sample:

$$\frac{X-Z}{X-Y} \times 0.0145 \times \frac{40}{5.8} \times 100 = \frac{X-Z}{X-Y} \times 10$$

2.0 grams sample:

$$\frac{X-Z}{X-Y} \times 0.0145 \times \frac{40}{2} \times 100 = \frac{X-Z}{X-Y} \times 29$$

Sample from Example I as is 5.8 grams was analyzed by the bisulfite method and gave the following results:
X = 31.0
Y = 11.6
Z = 15.6

$$\frac{X-Z}{X-Y} \times 10 = 7.94\% \text{ free glyoxal + CHO terminal groups}$$

Acetone precipitated sample weighing 2 grams was analyzed by the bisulfite method and gave the following results:
X = 37.8
Y = 18.1
Z = 28.9

$$\frac{X-Z}{X-Y} \times 29 = 13.1\% \text{ CHO terminal groups in dry polymer}$$

% solids in the liquid polymer = 46.9
13.1 × 0.469 = 6.14% CHO terminal groups in liquid material
% free glyoxal 7.94 − 6.14 = 1.8%

The 13.1% CHO terminal groups in the dry polymer correspond to about 2 terminal CHO groups in the assumed structure of the oligomer.

EXAMPLE II 406.0 parts by weight of a 40% aqueous glyoxal solution containing 2.8 moles of glyoxal were charged into a glass lined reactor. The temperature was 22° C. and the pH was 2.16. 60.0 parts by weight of urea (1.0 mole) were added to the glyoxal solution under agitation. After 15 minutes, a uniform solution resulted. The temperature dropped to 15° C. and the pH rose to 2.9. Low heat was applied and the temperature rose gradually within one hour's time to 46° C. The reaction mass was kept at a constant temperature of 46° for a four hour period. The reaction mass was then cooled to 20° C. and 4 parts of 10% by weight sodium hydroxide solution was added slowly. The final product appeared as a pale-yellow, clear liquid having 47.3% solids and a pH of 6.0.

The molar ratio of glyoxal to urea in Example II was 2.8 moles of glyoxal to 1 mole of urea.

EXAMPLE III 464.0 parts by weight of a 40% aqueous glyoxal solution containing 3.2 moles of glyoxal were charged into a glass lined reactor. The temperature was 20° C. and the pH was 2.16. 60.0 parts by weight of urea (1.0 mole) were added to the glyoxal solution under agitation. After 18 minutes time a uniform solution resulted, the temperature dropped to 12° C. and the pH rose to 2.8. Low heat was applied and the temperature rose gradually within one hour's time to 44° C. The reaction mass was kept at constant 44° C. for 4 hours. The reaction mass was then cooled to 20° C. and 4 parts by weight of 10% by weight sodium hydroxide solution was added slowly. The final product appeared as a pale-yellow, clear liquid having 46.5% solids and a pH of 6.0.

The molar ratio of glyoxal to urea in this Example III was 3.2 moles of glyoxal to 1.0 mole of urea.

EXAMPLE IV 261.0 parts by weight of a 40% aqueous glyoxal solution containing 1.8 moles of glyoxal were charged into a glass coated reactor. The temperature was 23° C. and the pH was 2.17. 60.0 parts by weight of urea (1 mole) were added to the glyoxal solution under agitation. After 15 minutes time a uniform solution resulted, the temperature dropped to 12° C. and the pH rose to 2.9. Low heat was applied and the temperature rose gradually within one hour to 45° C. and was kept constant at 45° C. for a four hour period. After cooling to 20° C., 4 parts by weight of 10% by weight sodium hydroxide solution was added slowly. The final product was a pale-yellow, clear liquid having 50.5% solids and a pH of 6.0.

The molar ratio of glyoxal to urea in this example was 1.8 mole of glyoxal to 1.0 mole of urea.

EXAMPLE V 217.5 parts by weight of a 40% aqueous glyoxal solution containing 1.5 moles of glyoxal were charged into a glass coated reactor. The temperature was 22° C. and the pH was 2.7. 60 parts by weight of urea (1 mole) were added to the glyoxal solution under agitation. After 15 minutes time a uniform solution resulted, the temperature dropped to 12° C. and the pH rose to 2.9. Low heat was applied and the temperature rose gradually within one hour's time to 45° C. The reaction mass was kept at constant temperature of 45° C. for the next 4 hours, then cooled to 20° C. 4 parts of sodium hydroxide 10% was added slowly. The final product appeared as a pale-yellow, clear liquid having 52% solids and a pH of 6.0.

The molar ratio of glyoxal to urea in Example V was 1.5 moles of glyoxal to 1.0 mole of urea.

Comparative Performance Tests

A test coating formula was prepared as follows:
100.0 parts Ultragloss 90 clay
8.0 parts Penford gum 280 starch
7.0 parts Polysar 55E SB latex
0.1% TSPP on clay (tetrasodium polyphosphate)
55.0% total solids
10% insolubilizer on binder, solids basis (about 3%)
pH 7.0

The following materials were added as insolubilizers:
No. 1. A commercial melamine formaldehyde resin, solids 62%.
No. 2. A commercial glyoxal-ehylene urea resin, solids 45%.
No. 3. Example No. 1, glyoxal-urea resin, solids 46.9%.
No. 4. Example No. 2, glyoxal-urea resin, solids 47.3%.
No. 5. Example No. 3, glyoxal-urea resin, solids 46.5%.
No. 6. Example No. 4, glyoxal-urea resin, solids 50.5%.
No. 7. Example No. 5, glyoxal-urea resin, solids 52%.

| Sample | 1 Minute Cure 120°C. | 2 Minutes Cure 120°C. |
|---|---|---|
| Wet Rub Results According to TAPPI UM463 | | |
| Blank | 2 | 2 |
| No. 1 | 4 | 10 |
| No. 2 | 3 | 4 |
| No. 3 | 9 | 15 |
| No. 4 | 9 | 15 |
| No. 5 | 9 | 15 |
| No. 6 | 1.5 | 2.5 |
| No. 7 | 1.8 | 3.8 |
| Comparative Efficiency of the Materials Against Example No. 1 as 100 | | |
| Blank | 22 | 13 |
| No. 1 | 45 | 67 |
| No. 2 | 34 | 27 |
| No. 3 | 100 | 100 |
| No. 4 | 100 | 100 |
| No. 5 | 100 | 100 |
| No. 6 | 17 | 17 |
| No. 7 | 10 | 26 |

The above tests show that the materials prepared according to the process of the invention with ratios glyoxal to urea in the range of 2.8–3.2 moles of glyoxal to 1.0 mole urea are at least 50% better than the standard melamine formaldehyde resin (Sample No. 1) and at least 3 times better than the commercial glyoxal-ethylene urea products (Sample No. 2).

When the molar ratio of glyoxal to urea is outside of the claimed optimum range, the performance of the materials drops drastically as to between 17–26% of the performance of the optimum ratio materials.

Three pigmented coatings formulas were used to evaluate the performance of different insolubilizers for wet-rub resistance using the Adams Wet Rub Tester.

| | Coating Formula (Parts) | | |
|---|---|---|---|
| Components | No. 1 | No. 2 | No. 3 |
| Clay No. 2 | 100 | 100 | 100 |
| S.B. Latex | — | 3 | 8 |
| Oxidized starch | 17 | 13 | 8 |

0.1% antifoam, 0.1% dispersant and 1% lubricant were added to all 3 formulations. 3% of insolubilizer were added to the formulas. pH=7.0.

Coatings were applied using the rod applicator (No. 8 rod) on the Keegan coater and sheets were continuously dried using two infra-red driers on the Keegan.

Coat weights were approximately 8–10 lb/3300 square feet and were controlled as closely as possible. Adams wet rub tests were run 24 hours after coating application. The procedure as supplied by the Testing Machines, Inc., the equipment suppliers, was modified to obtain the highest possible test accuracy. Whereas the procedure called for running one test strip and using a filtration technique with filter paper and drying the filter paper with residue, in the modified procedure 3 test strips (1 each from 3 different coated sheets) were used and the water was evaporated in aluminum dishes that contained the water used during the test sequence. The modified procedure adds to test accuracy because the filtration step is omitted and the inherent inaccuracies of filter papers with milligram differencies in residue weight are eliminated. Beside this, the residue weights are tripled by the use of 3 times greater surface area of coated paper. Each weight was divided by 3 for reporting to conform to the original procedure as supplied by the Testing Machines, Inc.

Summary of the Tests Using the Adams Wet-Rub Tester

| Insolubilizer | Adams Residue Grams | Brookfield Viscosity in cps at 10 RPM |
|---|---|---|
| Coating No. 1 | | |
| Blank | 0.0160 | 3200 |
| Commercial MF resin | 0.0050 | 3200 |
| Commercial glyoxal-ethylene urea resin | 0.0037 | 4000 |
| Commercial formaldehyde-free resin | 0.0040 | 6000 |
| Example No. 1 | 0.0020 | 3600 |
| Example No. 2 | 0.0021 | 3700 |
| Example No. 3 | 0.0020 | 3000 |
| Example No. 4 | 0.0117 | 3000 |
| Example No. 5 | 0.0076 | 3000 |
| Coating No. 2 | | |
| Blank | 0.0098 | 3600 |
| Commercial MF resin | 0.0027 | 3000 |
| Commercial glyoxal-ethylene urea resin | 0.0017 | 4600 |
| Commercial formaldehyde-free resin | 0.0026 | 8200 |
| Example No. 1 | 0.0013 | 3600 |
| Example No. 2 | 0.0013 | 4200 |
| Example No. 3 | 0.0012 | 4800 |
| Example No. 4 | 0.0076 | 3000 |
| Example No. 5 | 0.0050 | 3000 |
| Coating No. 3 | | |
| Blank | 0.0024 | 2600 |
| Commercial MF resin | 0.0061 | 2400 |
| Commercial glyoxal-ethylene urea resin | 0.0015 | 2600 |
| Commercial formaldehyde-free resin | 0.0021 | 3000 |
| Example No. 1 | 0.0010 | 2600 |
| Example No. 2 | 0.0010 | 2400 |
| Example No. 3 | 0.0010 | 2400 |
| Example No. 4 | 0.0059 | 2200 |
| Example No. 5 | 0.0038 | 2200 |

Comparative Efficiency of the Materials Against Example No. 1 as 100

| Sample No. | Coating No. 1 | No. 2 | No. 3 |
|---|---|---|---|
| Blank | 12 | 13 | 41 |
| Commercial MF resin | 40 | 48 | 16 |
| Commercial glyoxal-ethylene urea resin | 54 | 76 | 66 |
| Commercial formaldehyde-free resin | 50 | 50 | 48 |
| Example No. 1 | 100 | 100 | 100 |
| Example No. 2 | 95 | 100 | 100 |
| Example No. 3 | 100 | 108 | 100 |
| Example No. 4 | 17 | 17 | 17 |
| Example No. 5 | 26 | 26 | 26 |

The above tests show that the materials made according to the process of invention are 2–6 times better than the MF resins and 1.3–2 times better than the commercial formaldehyde-free formulations, depending on coating compositions.

While the invention has been described with reference to certain specific embodiments thereof, it is understood that it is not to be so limited since alterations and changes may be made therein which are within the full intended scope of the appended claims.

What is claimed is:

1. A formaldehyde-free coating insolubilizer which is a product of the reaction in aqueous solution, of about 2.8 to about 3.2 moles of glyoxal to 1.0 mole of urea at temperatures between about 40°–50° C., containing about 95–96% polymeric material and less than 2% free glyoxal wherein a 40% by weight solution of the acetone precipitated polymeric material has a reduced viscosity $\eta sp/c$ at 30° C. as measured by the Cannon-Fenske instrument of 0.089.

2. A paper coating composition comprising a pigment, a binder, an antifoam, a dispersant, a lubricant and an insolubilizer of claim 1.

3. The composition of claim 2 where the amount of insolubilizer is from about 1 to about 10 percent, based on the weight of the binder.

4. The process for insolubilizing the binder in a paper coating composition which comprises applying to paper a composition containing about 1 to about 10 percent, based on the weight of the binder, of the insolubilizer of claim 1.

5. The formaldehyde-free coating insolubilizer of claim 1 which is a product of the reaction of 3.0 moles of glyoxal to 1.0 mole of urea.

* * * * *